L. P. CRECELIUS.
METHOD AND APPARATUS FOR BONDING RAILS.
APPLICATION FILED MAR. 27, 1916.
1,242,527.
Patented Oct. 9, 1917.
2 SHEETS—SHEET 1.
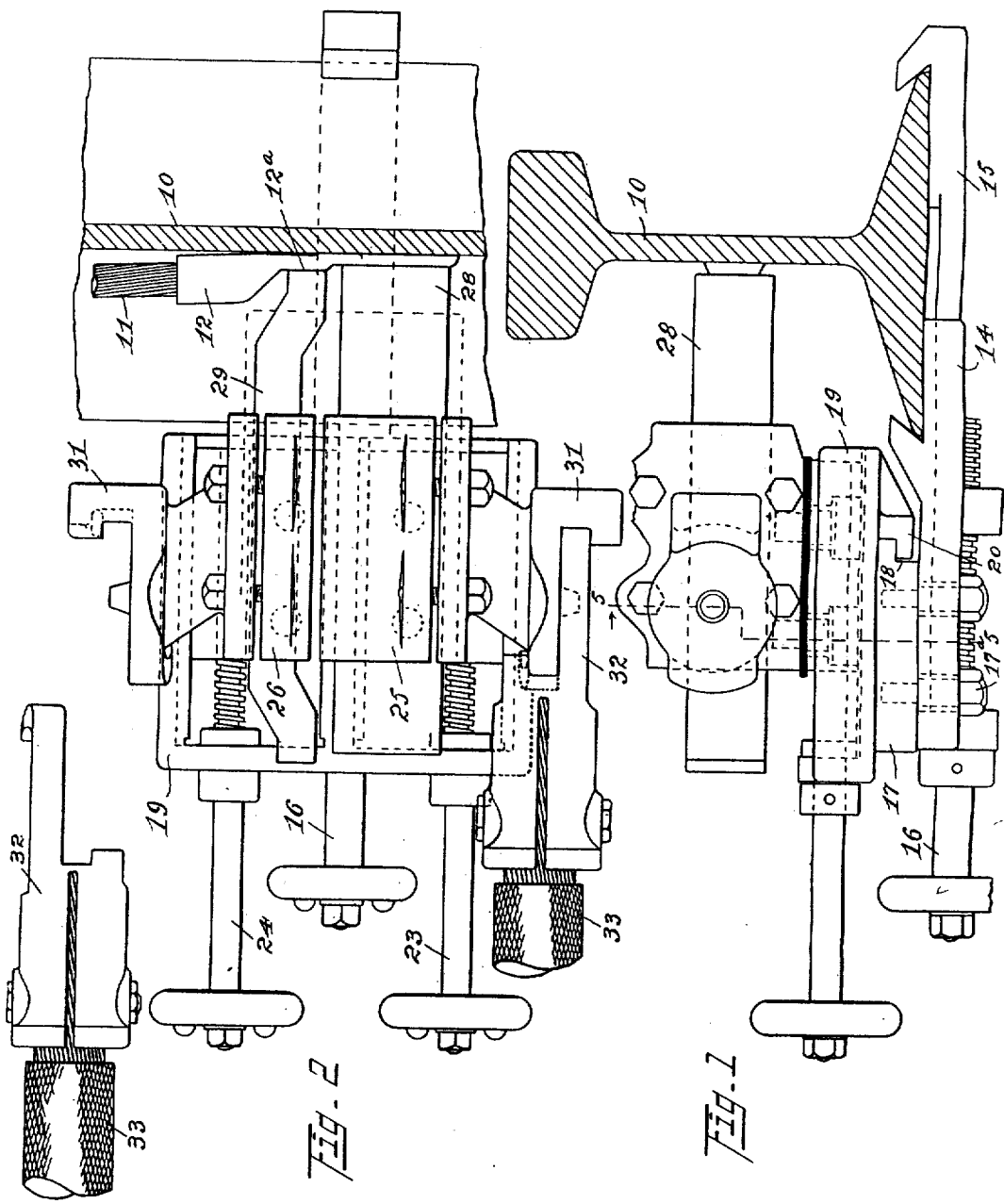
Inventor
Lawrence P. Crecelius
by Thurston & Kwis
Attorneys

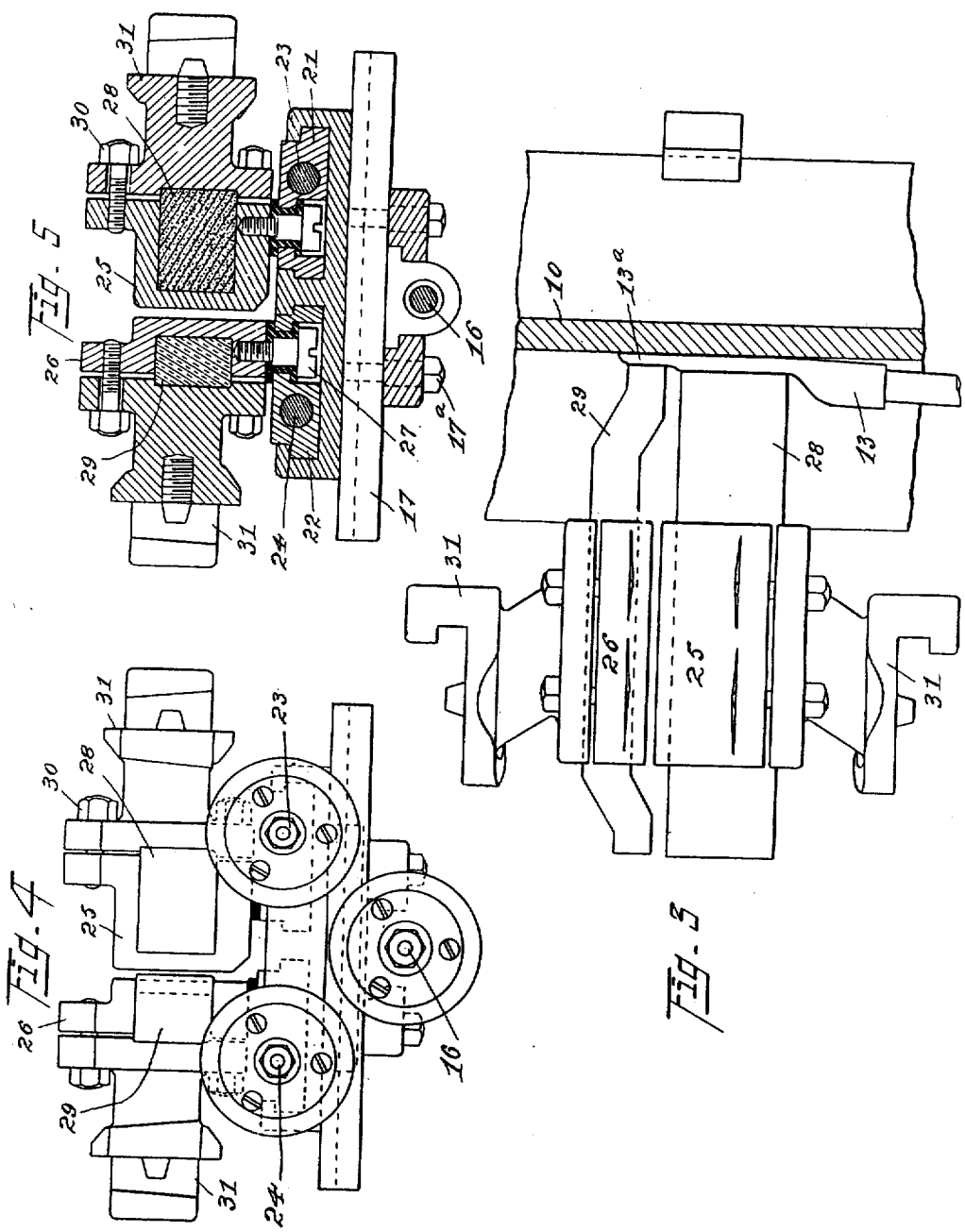

UNITED STATES PATENT OFFICE.

LAWRENCE P. CRECELIUS, OF CLEVELAND, OHIO, ASSIGNOR TO THE ELECTRIC RAILWAY IMPROVEMENT COMPANY, OF CLEVELAND, OHIO, A CORPORATION OF OHIO.

METHOD AND APPARATUS FOR BONDING RAILS.

1,242,527. Specification of Letters Patent. Patented Oct. 9, 1917.

Application filed March 27, 1916. Serial No. 86,889.

*To all whom it may concern:*

Be it known that I, LAWRENCE P. CRECELIUS, a citizen of the United States, residing at Cleveland, in the county of Cuyahoga and State of Ohio, have invented a certain new and useful Improvement in Methods and Apparatus for Bonding Rails, of which the following is a full, clear, and exact description.

This invention relates to rail bonding and has for its chief object to provide an improved method of bonding and apparatus for carrying out the method which is efficient, which does not obstruct traffic while the rail is being bonded, and which does not require extreme skill on the part of the bonder to satisfactorily braze bonds to the rails.

It has been proposed heretofore, to apply bonds to track rails by pressing against the terminal of the bond a heating electrode and passing an electric current through the electrode, bond and rail being bonded. This apparatus is carried by a bonding car which is run on the rails of the track and is very unsatisfactory for the reason that it obstructs traffic while the rail is being bonded.

It has been proposed, also, to braze bonds to the rails by pressing against the terminal of the bond two heating electrodes and passing an electric current through the two electrodes and through the bond with the three in series relationship. The electrodes are supported at the side of the rail being bonded on a rail clamping device so that the gage line is clear and unobstructed.

The apparatus employed in carrying out my invention is arranged to be supported from or clamped to the rail with the working parts of the apparatus at one side of the rail so as not to obstruct the gage line, and it includes a single heating electrode of high resistance and a contactor or conductor of low resistance, both adapted to be clamped against the bond, one for the purpose of heating the bond and the other for completing the electric circuit from one terminal of the transformer or other source of current, through the heating electrode, bond, and back to the other terminal of the source of current. With this apparatus the terminal of the bond is brazed to the rail opposite the single heating electrode only, the contactor producing no heating effects.

My invention may be briefly summarized as consisting in certain novel steps of an improved method of bonding and in certain novel details of construction and combinations and arrangements of parts of a novel bonding apparatus which will be described in the specification and set forth in the appended claims.

In the accompanying sheet of drawings wherein I have shown the preferred embodiment of my invention, Figure 1 is a side view of the apparatus attached to the rail and ready for use, the rail being shown in section; Fig. 2 is a top plan view of the same with the rail in longitudinal section through the web thereof; Fig. 3 is a view similar to Fig. 2, omitting some of the parts, this view showing the manner in which the heating electrode and contactor engage the opposite terminal of the bond to that shown in Fig. 2; Fig. 4 is an end view of the apparatus looking toward the rail; and Fig. 5 is a vertical sectional view substantially along the line 5—5 of Fig. 1.

In the drawings, 10 represents the rail to be bonded, and 11 one form of bond which is designed to be brazed to the rail by my improved apparatus, this bond having terminals 12 and 13, one being the right hand terminal and the other the left hand terminal. The two terminals are slightly different as they are shaped to accommodate the same pair of heating and contacting devices without requiring a right hand and a left hand set, as will be subsequently explained.

The bonding apparatus itself includes a rail clamping device composed of two parts 14 and 15, which are designed to engage and clamp opposite edges of the rail flange as shown particularly in Fig. 1, the two parts being relatively adjustable through a suitable hand adjusting screw 16, by which the part 15 is moved inwardly to clamping position or outwardly to release the clamp from the rail. Secured to the main member 14 of the clamp by screws 17ª, is a base or support 17 for an electrode and contactor carrier, which is in the form of a plate having along its forward end, that is to say, the edge next to the rail, an undercut portion 18. Resting on the base 17 is a rectangular electrode and contactor carrier 19, having along its lower front side a flanged projection 20 which is adapted to engage and fit under the recessed or undercut part 18 of the base 17 in the manner shown in Fig. 1. This carrier 19 is provided with two guideways for two slides 21 and 22 which are adapted to be moved back and forth in the guideways toward and from the rail by a pair of adjusting screws 23 and 24 arranged slightly above and on opposite sides of the center clamp adjusting screw 16. Secured to the slides 21 and 22 are two box-like holders 25 and 26 which are insulated from each other and from the slides 21 and 22 and are secured to the slides by insulated bolts 27. The holder 25 receives and is tightly clamped about a high resistance heating electrode 28 which is preferably formed of carbon, but may be formed of other high resistance material, and, the holder 26 receives and is tightly clamped about a low resistance contactor or conductor 29 which is preferably formed of copper, although other suitable low resistance good conducting material may be employed. I prefer to employ copper for the contactor as it is not desired that heat be generated in the contactor or that it heat the portion of the bond terminal which it engages.

The holders 25 and 26 are each formed of two parts which are secured together by bolts 30, and one part or side of each of the holders is provided with a quick detachable coupling member 31 designed to be coupled to counter-part coupling members 32, to which are attached leads 33 extending from a suitable source of current. Preferably, these leads extend from the secondary of a suitable transformer not shown, the primary of which will be supplied with alternating current.

Both the heating electrode and contactor are designed to be clamped against different portions of the bond terminal, the portion which is engaged by the high resistance heating electrode 28 being preferably faced with brazing material as this portion is to be brazed to the rail. The portion which is engaged by the contactor 29 is either at the outer end of the terminal or at the inner portion thereof, depending upon whether the terminal is the right hand terminal or the left hand terminal of the bond. In Fig. 2, wherein the electrode and contactor are shown engaging the right hand terminal 12 of the bond, the heating electrode engages the outer end of the terminal and the contactor engages the terminal between the heating electrode and the boss or socketed part of the terminal which receives the stranded part of the bond. This portion of the terminal engaged by the contactor may be slightly elevated or provided with a shoulder, as shown at 12ª, although this is not absolutely necessary. In Fig. 3, wherein the heating electrode and the contactor are shown engaging the left hand terminal, the heating electrode engages a portion of the terminal next to the boss or socketed part of the bond, and the contactor engages a projection 13ª at the outer end of the bond, this projection being shown in this case as of less thickness than the portion which is opposite the heating electrode, although it is not essential that this projection 13ª of the terminal be formed as here shown. The brazing material with which the bond terminals are faced, need not extend either to the shouldered part 12ª shown in Fig. 2 or the recessed part 13ª shown in Fig. 3, for these portions of the terminals are not brazed to the rail, as previously explained. It will be understood that it is not essential that the electrode and contactor engage the precise portions of the bond as shown in the drawings, and it will be understood, also, that in the event it is desired to use right and left hand sets of heating and contacting devices for the right and left hand terminals, or if it is desired to reverse the relative positions of the heating electrode and contactor both terminals of the bond may be similarly formed or shaped.

When the electrode and contactor are clamped against the terminal as explained, an electric current is passed from one terminal of the source of current through the heating electrode and bond, and back to the other terminal of the source through the contactor. The high resistance heating electrode 28 is heated to a very high degree by the current and heats the terminal by conduction. Additionally, the bond is heated opposite the heating electrode 28 by the heat generated at the surfaces of contact between the heating electrode and terminal and the terminal is heated also directly by the current passing through it. This very soon heats the bond sufficiently to cause it to be brazed to the rail opposite the heating electrode, the portion opposite the contactor not being brazed, as explained heretofore. Inasmuch as the heating is done by only one electrode, this apparatus has the advantage over two heating electrodes in series relationship in that it is not necessary to adjust two electrodes relatively during the heating operation to maintain a thermic balance. Thus the bonding can be done by a more or less unskilled operator. In fact, it may not be necessary to adjust either the electrode or the contactor from the start to the completion of the brazing operation. The contactor 29 need not be adjusted at any time after the start of the heating operation, as it is simply clamped firmly against the terminal of the bond prior to the heating operation and at the end thereof is backed away to permit the apparatus to be detached from the rail. The electrode 28 may, if desired, be moved forwardly as the heating progresses, but in any event, the relative pressure of the electrode and contactor on the bond is a matter of no consequence with this apparatus.

Having described my invention, I claim:

1. In a rail bonding apparatus, supporting means, and a high resistance heating electrode and a low resistance contactor both carried by the supporting means and arranged side by side so as to engage a bond.

2. In a rail bonding apparatus, supporting means, a single heating electrode carried thereby and adapted to engage the bond, and relatively low resistance means carried by said supporting means at the side of the electrode and adapted to make electrical contact with the bond.

3. In a rail bonding apparatus, supporting means adapted to be secured to the rail in such a manner that traffic on the rail is free and unobstructed, and a pair of bond engaging devices supported thereby so as to be located at one side of the rail and adapted to engage a bond to be secured to the rail, one of said devices having a high resistance and the other a relatively low resistance.

4. In a rail bonding apparatus, supporting means adapted to be secured to the rail so as not to obstruct traffic, a heating electrode and a contactor of relatively low resistance supported thereby so as to be located on the same side of the rail and adapted to engage a bond to be secured to the rail, and means for moving the electrode and contactor separately toward and from the rail.

5. In a rail bonding apparatus, supporting means, a pair of holders carried thereby and insulated from each other and carrying respectively a heating electrode and a contactor through which current may be passed when said devices engage a bond, said electrode being a high resistance heating electrode and the contactor being a relatively low resistance conductor.

6. In a rail bonding apparatus, a rail clamp, a heating electrode and a contactor carried thereby and arranged side by side so that they may engage a bond pressed against the rail, said electrode having high resistance and the contactor a relatively low resistance.

7. In a rail bonding apparatus, a rail clamp, a high resistance heating electrode and a relatively low resistance contactor carried thereby and arranged side by side so that they may engage a bond pressed against the rail, and means for adjusting the electrode and contactor toward and from the rail.

8. In a rail bonding apparatus, a rail clamp adapted to be attached to and detached from the rail, a high resistance heating electrode and a relatively low resistance contactor supported thereby so that the gage line is clear and unobstructed when the clamp is attached to a rail.

9. In a rail bonding apparatus, a rail clamp adapted to be attached to and detached from the rail, a high resistance heating electrode and a relatively low resistance contactor supported by the clamp at one side of the rail when the clamp is attached to the rail, so that the gage line is clear and unobstructed, and means for moving the electrode and contactor toward and from the rail.

10. In a rail bonding apparatus, a rail clamp, holding means supported thereby and comprising a pair of slides movable toward and from the rail, a pair of bond engaging devices carried by said slides, one being a high resistance heating electrode and the other being a low resistance contactor.

11. In a rail bonding apparatus, a rail clamp, carrying means detachably seated on said clamp, a pair of bond engaging devices carried by said means and movable toward and from the rail, one of said devices being a high resistance heating electrode and the other a low resistance contactor.

12. The method of brazing a bond to a rail which consists in pressing against the bond a high resistance heating electrode and a relatively low resistance contactor, and passing current through the electrode bond and contactor.

In testimony whereof, I hereunto affix my signature.

LAWRENCE P. CRECELIUS.

Copies of this patent may be obtained for five cents each, by addressing the "Commissioner of Patents, Washington, D. C."